US005311949A

United States Patent [19]

Chapin

[11] Patent Number: 5,311,949

[45] Date of Patent: May 17, 1994

[54] POWER SCREWDRIVER HANDLE CONFIGURATION

[75] Inventor: David S. Chapin, Raleigh, N.C.

[73] Assignee: Cooper Industries, Inc., Houston, Tex.

[21] Appl. No.: 897,111

[22] Filed: Dec. 3, 1992

[51] Int. Cl.[5] .......... H02K 7/14

[52] U.S. Cl. .......... 173/217; 173/170

[58] Field of Search .......... 173/217, 170; 81/489, 81/177.1; 310/47, 50

[56] References Cited

U.S. PATENT DOCUMENTS

| | | | |
|---|---|---|---|
| 1,377,288 | 5/1921 | Soresi | 310/47 |
| 2,118,230 | 5/1938 | Rice | 310/50 |
| 2,979,089 | 4/1961 | Piesker | 173/217 |
| 3,489,936 | 1/1970 | Boyles | 310/50 |
| 3,509,629 | 5/1970 | Kidokoro et al. | 310/50 |
| 3,588,936 | 6/1971 | Duve | 310/50 |
| 4,164,670 | 8/1979 | Maher | 310/50 |

*Primary Examiner*—Scott Smith
*Attorney, Agent, or Firm*—Gregory L. Maag

[57] ABSTRACT

A power tool handle includes a tapered tubular portion, which contains a battery pack, a motor, and a gear box. The switch for controlling the electricity from the battery pack to the motor is placed over the gear box and extends through the housing.

7 Claims, 2 Drawing Sheets

POWER SCREWDRIVER HANDLE CONFIGURATION

BACKGROUND OF THE INVENTION

The present invention pertains to power tools; more particularly, the present invention pertains to hand held power tools such as screwdrivers or nutdrivers.

In recent years the down sizing of motors, gear boxes, and battery packs, has allowed the placement of batteries, motors, and gear boxes in the handles of hand held power tools. One common example is a power screwdriver. Such power screwdrivers have become readily available and great aids to construction workers and repairmen.

While hand held power screwdrivers are convenient, extended use of these power screwdrivers has surfaced some needs to make the power screwdriver more user friendly. The first of these needs is a reduction in the extended length normally found in power screwdrivers. Most power screwdriver manufacturers have found that tool handles must be made long to contain the battery, the motor, and the gear box. This handle length is increased even further by the placement of a switch mechanism between the battery and motor or anywhere along the central axis of the tool to control both the flow of electricity and the rotational direction of the motor. Extended handle length reduces usability of the power screwdriver in small spaces. Additionally, the farther back on the handle the switch is placed, the further back on the handle the tool is held. Unfortunately, such hand position diminishes control of the power tool.

There is a need to shorten the handles of power screwdrivers to overcome the foregoing problems. Such shortening should include placing the "on-off" and directional control switches as far forward as possible so that the operator need not re-position the hand when operating the power screwdriver.

Secondly, most power screwdrivers are generally cylindrical. For single-use, infrequent operation, a cylindrical configuration may be satisfactory. But, for the professional user, the cylindrical shape creates undue muscle strain as the space created in the human hand when an operator curls fingers around a tool is not cylindrical, but conical. There is, therefore, a need to shape the handle of a power screwdriver more like the opening formed in a human hand when it encircles a tool and to provide adequate resistance to torque so the tool does not turn in the hand.

Third, most power screwdrivers have generally smooth or lightly textured surfaces. For low-torque applications, such surfaces may be entirely satisfactory. For high torque applications or applications where the user's grip has been weakened by a disease, such as Carpal Tunnel Syndrome, there is a need to enhance the user's ability to grip the power screwdriver handle.

There is, therefore, a need in the art to provide a power tool handle that has a shortened handle with easily accessible operating controls, a shape conforming to the user's hand and a surface which is easy to grip even in high torque situations.

SUMMARY OF THE INVENTION

The power tool handle of the present invention includes a shortened handle with forward mounted controls, a shape conforming to the human hand and an easy to grip surface.

The power tool handle of the present invention contains a switch mechanism which is not in line with the battery pack, the electric motor, and the gear box. The position of the switch mechanism is near the front of the tool for ease of operation. The housing itself is substantially conical to conform to the space formed in the human hand when the fingers are wrapped around the tool handle. Finally, a plurality of ridges have been formed on the tool surface in a partial herringbone configuration. These ridges assure a firm grip on the tool even in high torque situations for both clockwise and counter-clockwise rotations.

BRIEF DESCRIPTION OF THE DRAWINGS

A better understanding of the power tool handle of the present invention may be had by reference to the figures wherein.

DESCRIPTION OF THE EMBODIMENTS

Figure 1:
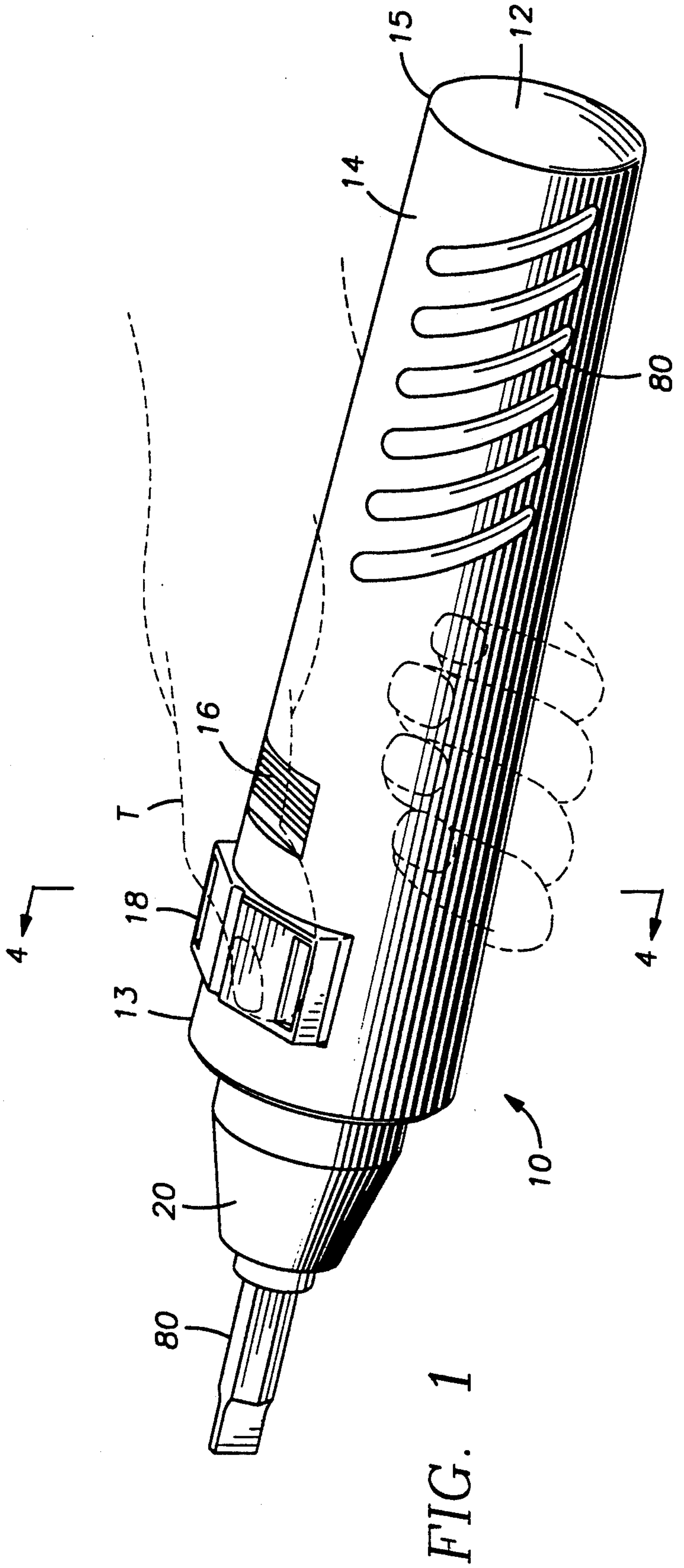
FIG. 1 is a perspective view of the tool handle of the present invention.
Figure 3:
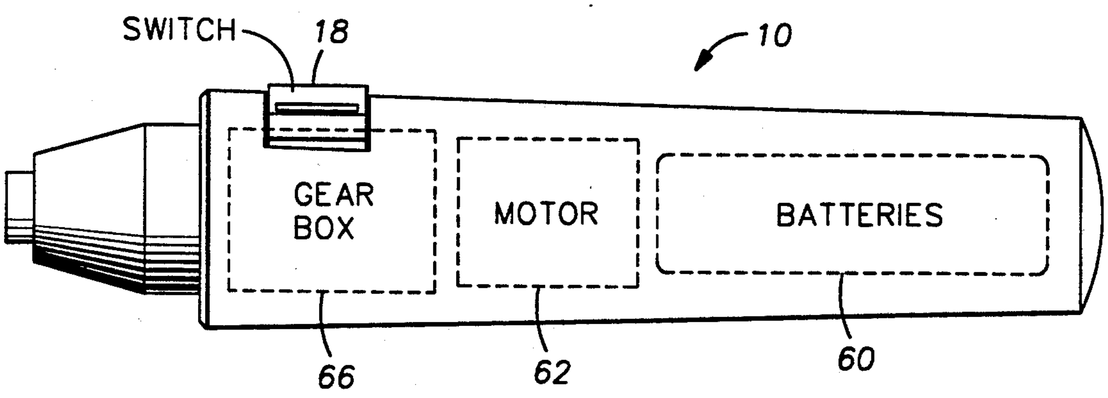
FIG. 3 is a schematic depiction of the screwdriver handle of the present invention.

In FIG. 1 it may be seen that the power tool handle 10 of the present invention includes a substantially tapered tubular housing 12 running from a larger forward end 13 to a smaller aft end 15. On the surface 14 of the housing 12 are two manual switches 16, 18. Switch 16 is the "on-off" switch. Switch 16 controls the flow of power from battery pack 60 to the motor 62 (see FIG. 3). Switch 18 is the rotation direction control switch. This switch 18 controls the direction of rotation of the bit 80 which extends from the front 20 of the tool 10. This control of rotation of direction is accomplished by changing the polarity of the electrical flow from battery pack 60 to motor 62 (FIG. 3). If desired, switches 16 and 18 may be combined into one switch mechanism or be co-located in one position. Of importance to this invention is the location of switches 16 and 18. In the prior art screwdriver handles schematically illustrated in FIG. 3, it was found necessary to locate switches in the middle of the tool's handle. By moving the switch mechanisms 16 and 18 off the center line of the handle, switches 16 and 18 are in a place where they are easily operated by the user's thumb.

Figure 2:
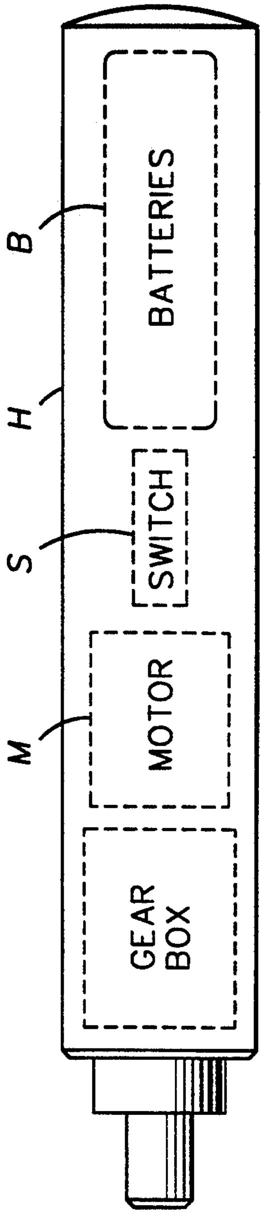
FIG. 2 (PRIOR ART)
FIG. 2 is a schematic depiction of the arrangement of internal components in prior art screwdriver handles.

As may be seen in FIG. 2, prior art rotational control switches "S" have been typically located between the batteries "B" and motor portion "M" of the power screwdriver handle "H". Such placement was necessitated by the size and shape of switch "S". This location of the directional control switch "S" on power screwdriver handles "H" places the directional control switch "S" far back along the handle "H". Such placement requires re-positioning of the user's hand for operation.

Figure 4:
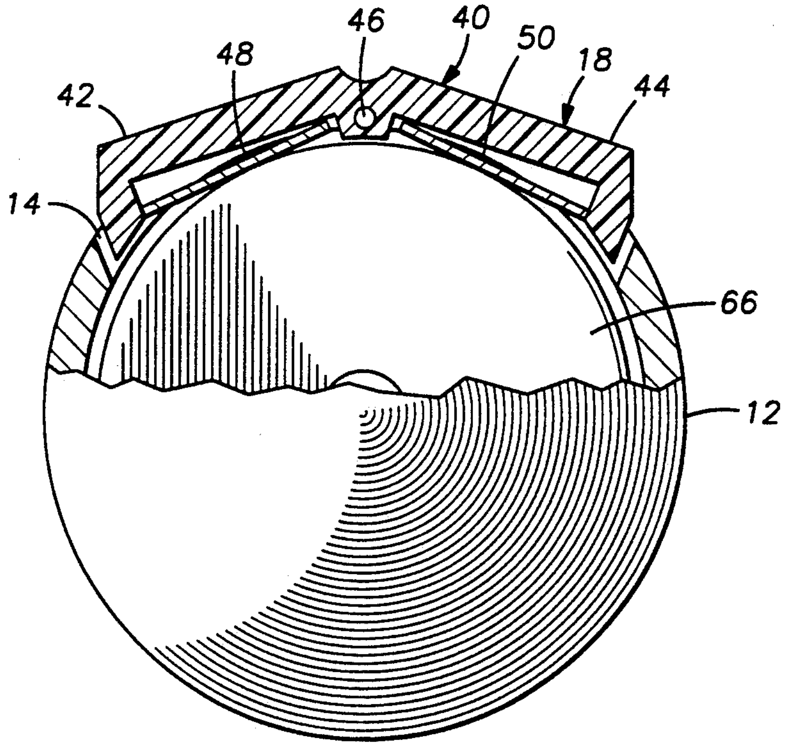
FIG. 4 is a cross-sectional view of the screwdriver handle taken at line 4—4 of FIG. 1.

In the preferred embodiment of the power screwdriver handle 10 of the present invention, and as may be seen in FIGS. 3 and 4, directional control switch 18 has been placed over the gear box 66. This placement provides several unique advantages. It allows for a substantially shorter tool handle 10 and it allows for totally one-handed operation of the tool. Additionally, the user is able to keep the hand well forward on the tool for better control. In prior art tools, placing one's hand at the center of balance necessitated placing one's hand further back on the tool.

As may be seen in FIG. 1, the rotational direction of the tool may be easily controlled by utilization of thumb "T" pressure on the directional control switch 18. Such thumb "T" pressure may be applied without removing one's hand from gripping the tool.

The improvement which permits the shortened handle 10 length and the convenient switch 18 placement is utilization of a switch mechanism 18, such as shown in FIG. 4, which is manufactured in a substantially flat configuration. This flat configuration of the switch mechanism 18 allows for displacing the switch mechanism 18 away from the center line of the tool. In the tool handle 10 of the present invention, the switch mechanism 18 is placed over the gear box 66. It will be understood by those of ordinary skill in the art that switch mechanism 18 may also be placed over the motor. The rocker switch system 40 extends through the surface 14 of the housing 12 of the tool. While a rocker switch mechanism 40 is shown in the preferred embodiment, it will be understood by those of ordinary skill in the art that other systems such as slides, buttons, rollers or other similar pressure responsive switches may be utilized without departing from the scope of the invention. If the switch mechanism 18 were left between the battery 60 and the motor 62, such placement of the switch mechanism 18 near the front of the tool would not be possible.

As may be further seen by reference to FIG. 4 in the preferred embodiment, rocker switch system 40 has left and right portions 42 and 44 and a central pivot point 46. Contact members 48 and 50 are moved into electrical contacts (not shown) to complete the circuitry which controls the direction of rotation of the tool. Other methods of making electrical contact will be well known to those of ordinary skill in the art.

Shortening of the handle and making it more user-friendly by relocating the switch mechanism more forward on the tool has been combined with two other improvements which distinguish the power tool handle of the present invention from others in the prior art. First, the outside of the handle is tapered in a substantially conical form away from the tool handling bit. The advantage of this configuration is readily apparent if one merely looks at the space formed in one's hand if the fingers are wrapped around an imaginary tool handle. The space is smallest near the little and ring fingers, but the space increases moving toward the thumb and index finger. So too with the shape of the tool handle of the present invention. While the preferred embodiment is formed in the shape of a truncated regular cone, it will be understood that a variety of tapered shapes may be used without departing from the scope of the invention. Those of ordinary skill in the art will understand that as a user pushes forward on a tool, a conical handle wedges itself tighter within a gripping hand rather than allowing the hand to slide along the surface of the tool.

The second improvement is a partial herringbone pattern 80 of ridges formed along either side of handle 10. This pattern 80 provides both an axial component which enables the user to resist the torque developed by the motor and a radial component which facilitates pushing along the long axis of the tool. It has been found that ridges 80 formed of rubber or vinyl are most comfortable to users.

In some applications, the tool user does not need powered rotation. Rather, manual operation is satisfactory. In the tool of the present invention, gear box 66 locks when not supplied with power. The locked gear box 66 allows the power tool to be used like a manual tool.

There is now provided by the power tool handle 10 of the present invention, a convenient to use, one-handed operational power tool.

While the present invention has been disclosed with reference to the preferred embodiment, it will be understood by those of ordinary skill in the art, that other embodiments of the present invention may be made by reference to the specification and the appended claims.

I claim:

1. A power tool handle comprising:

an elongate housing having a frusto-conical shape and comprising a longitudinal axis, a forward end having a first diameter and an aft end having a second diameter smaller than said first diameter and an outer surface tapering from said forward end to said aft end, said housing constructed and arranged for containing:

a battery pack;

an electric motor constructed and arranged to be in line with and driven by said battery pack;

a gear box mechanically interconnected in line with said electric motor;

a manually activated rocker switch disposed in said housing near said forward end of said housing and adapted to control the direction of rotation of said electric motor;

a manually activated slidable switch for directing electrical energy from said battery pack to said electric motor, said rocker switch including a central ridge and a thumb-actuatable pad on each side of said ridge, said rocker switch being disposed on said housing such that said ridge ia substantially parallel to said longitudinal axis of said housing, said slidable switch disposed between said rocker switch and said aft end of said housing and adjacent said rocker switch; and a plurality of ridges located on said outer surface of said housing adjacent said aft end, said ridges comprising an array of substantially parallel raised segments formed on said outer surface of said housing;

wherein said manually activated rocker switch is positioned substantially over said gear box and;

wherein said rocker switch and said slidable switch are both disposed on said tapered surface of said housing.

2. A power tool handle comprising:

a housing having a frusto-conical shape including a longitudinal axis, a larger forward end and a smaller aft end and an outer surface tapered between said forward and aft ends;

a gear box retained in said housing in a position near said forward end of said housing;

a motor retained in said housing in-line with said gear box and located between the forward and aft ends of said housing;

a manually activated rocker switch disposed on said housing and positioned substantially over said gear box for controlling the direction of rotation of said motor, said rocker switch including a central ridge and a thumb-actuatable pad on each side of said ridge, said rocker switch being disposed on said housing such that said ridge is substantially parallel to said longitudinal axis of said housing;

a battery pack retained in-line with said motor and positioned near the aft end of said housing; and a plurality of ridges located on said outer surface of said housing adjacent said aft end, said ridges comprising an array of substantially parallel raised segments formed on said outer surface of said housing.

3. A handle for a hand-held power tool having a rotatable chuck for retaining and providing torque to a tool shaft, the handle comprising:

an elongate body having a frusto-conical shape, said body including a longitudinal axis, a forward end having a first diameter and an aft end having a second diameter smaller than said first diameter, and including an outer surface extending between said forward end and said aft end;

a chamber formed within said body;

a battery pack retained in said chamber;

a motor retained in line with said battery pack in said chamber;

a gear box disposed in line with said motor and said battery pack in said chamber, said gear box interconnecting said motor and the rotatable chuck;

a rocker switch disposed on said body between said forward end and said aft end and adjacent said forward end for controlling the direction of rotation of said motor, said rocker switch including a central ridge and a thumb-actuatable pad on each side of said ridge, said rocker switch being disposed on said body such that said ridge is substantially parallel to said longitudinal axis of said body;

an array of protrusions disposed on opposite sides of said body at locations adjacent and said aft end, said arrays comprising a plurality of spaced-apart ridges wherein each of said ridges in a given array is substantially parallel to the other ridges in said given array, and wherein said ridges are formed on said outer surface of said handle.

4. The handle of claim 3 further comprising a power switch disposed on said body adjacent said rocker switch and between said rocker switch and said aft end for controlling the power between said battery pack and said electric motor, said power switch being substantially flush with said outer surface of said body.

5. The handle of claim 4 wherein said power switch comprises a thumb-actuatable slide switch adapted for reciprocal motion in a direction substantially parallel to said longitudinal axis of said body.

6. The handle of claim 4 wherein said power switch is positioned in such close proximity to said rocker switch that said thumb-actuatable pads of said rocker switch and said power switch may each be actuated by thumb pressure supplied by the operator without requiring the repositioning of the handle in the operator's hand.

7. The handle of claim 3 wherein said outer surface of said body comprises a pair of side surfaces, each of said pair including one of said arrays of protrusions; and wherein said outer surface further includes an upper surface disposed between said side surfaces, said upper surface being free of said protrusions; and wherein said rocker switch is disposed on said upper surface.

* * * * *